June 6, 1944. F. A. FAVILLE 2,350,598
MARINE POWER PLANT AND METHOD
Filed Nov. 29, 1943 4 Sheets-Sheet 1
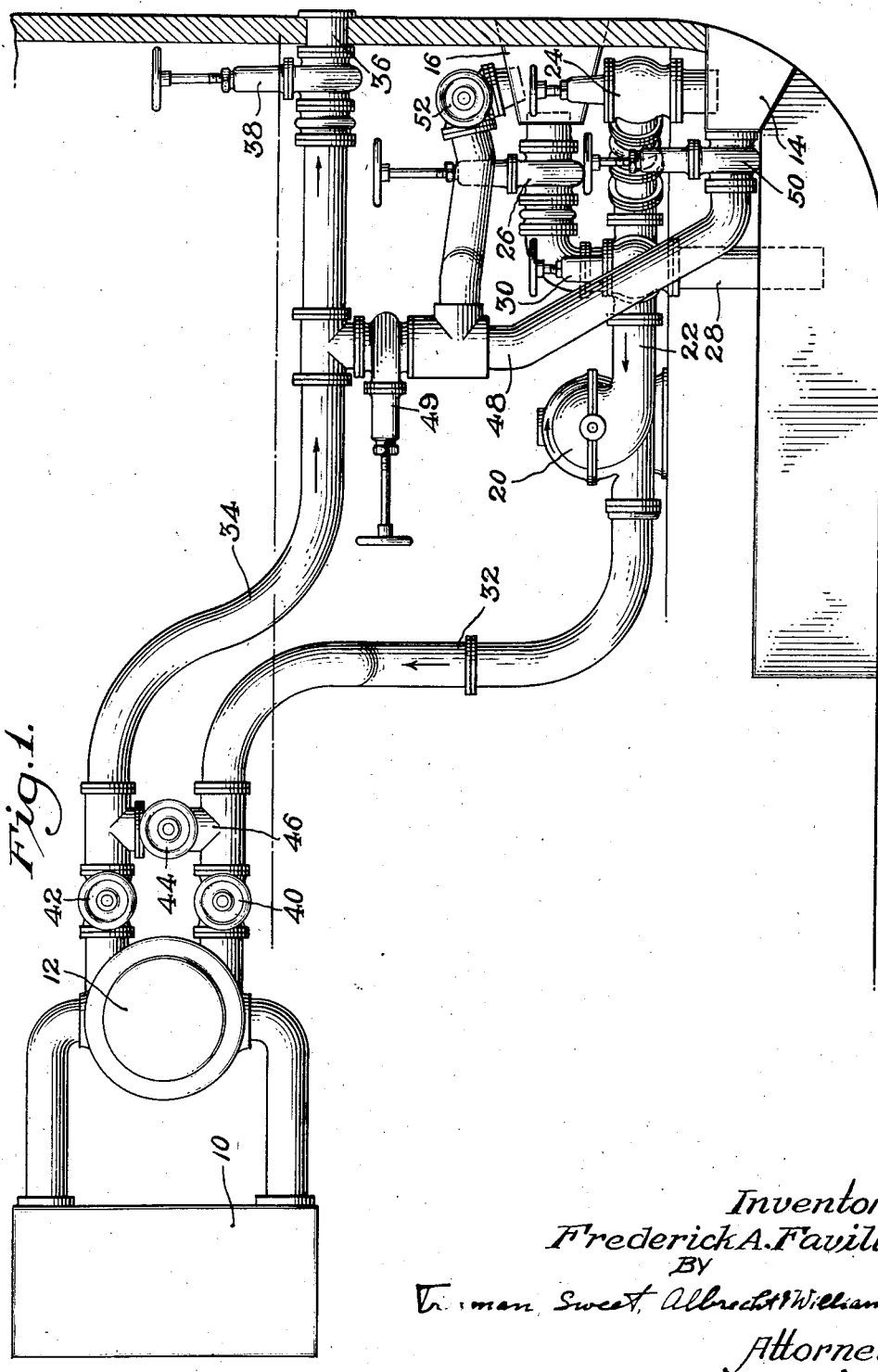
Inventor
Frederick A. Faville
BY
Truman Sweet, Albrecht & Williams
Attorneys

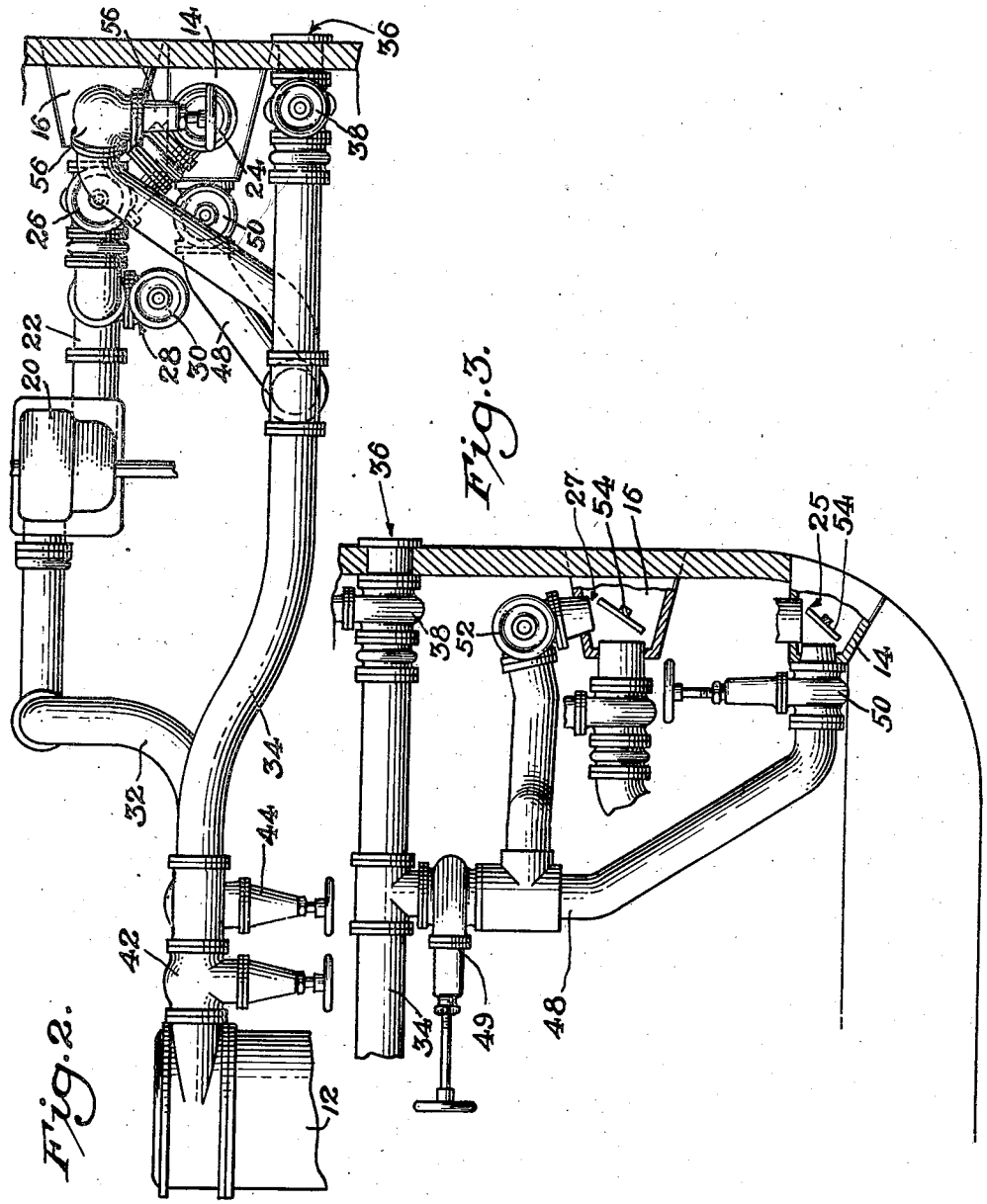

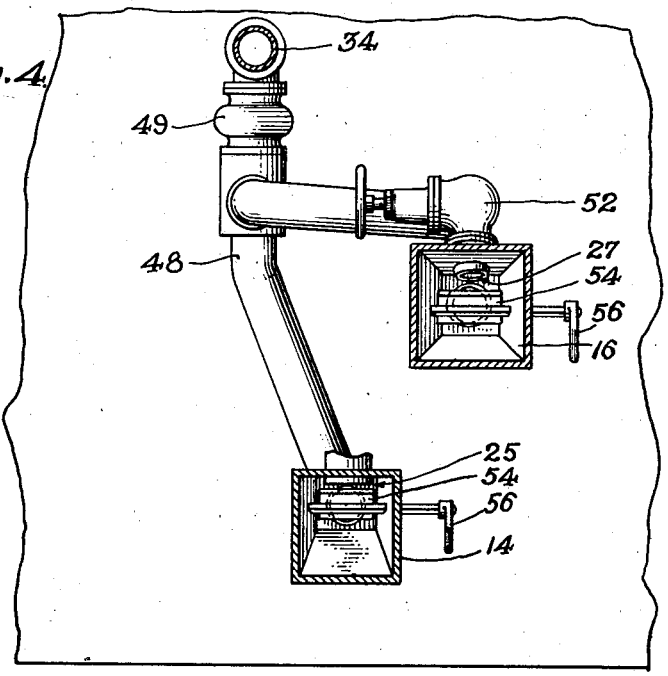
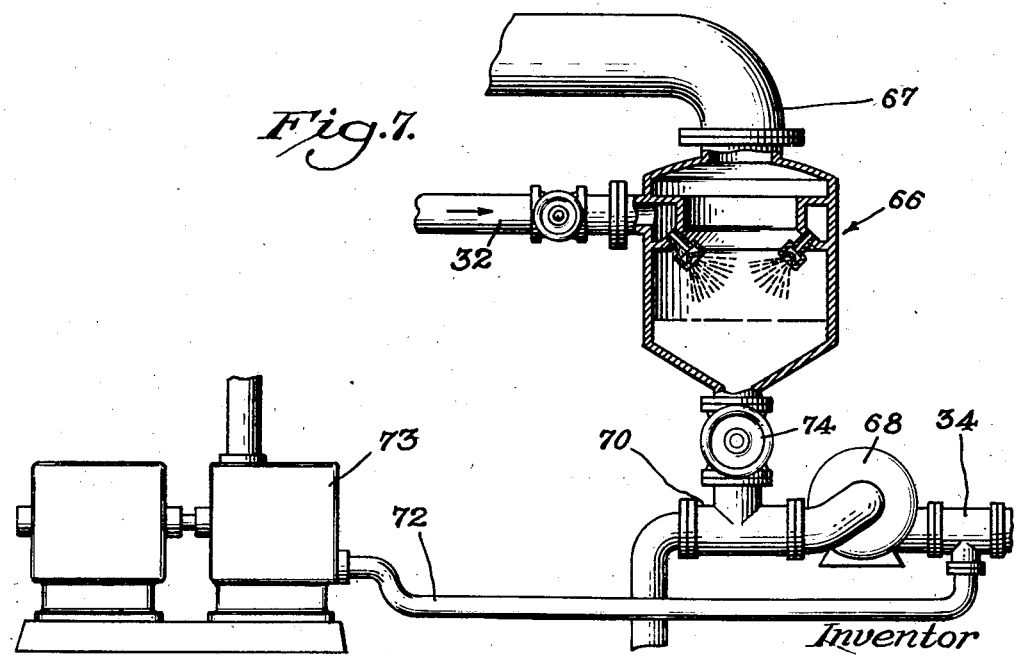

June 6, 1944. F. A. FAVILLE 2,350,598
MARINE POWER PLANT AND METHOD
Filed Nov. 29, 1943 4 Sheets-Sheet 4
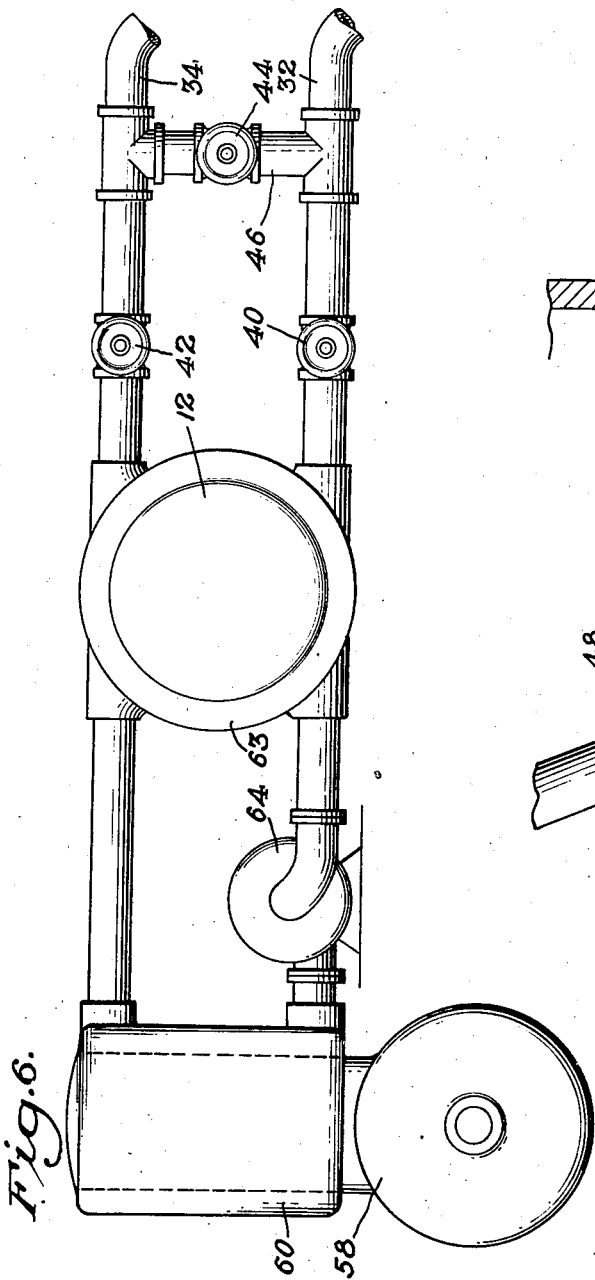
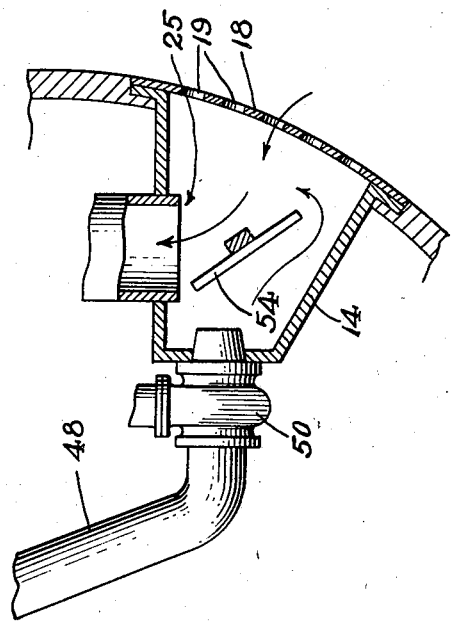
Inventor
Frederick A. Faville
BY
Freeman, Sweet, Albrecht & Williams
Attorneys Patented June 6, 1944

2,350,598

UNITED STATES PATENT OFFICE 2,350,598

MARINE POWER PLANT AND METHOD

Frederick A. Faville, Wilmette, Ill.

Application November 29, 1943, Serial No. 512,265

9 Claims. (Cl. 257—1)

My invention relates to marine type power plants, and includes among its objects and advantages an increase in adaptability to different conditions of service; and throughout the range of service condition, an increased protection of the cooling system from strains and stresses, particularly those due to thermal expansion and contraction.

In the accompanying drawings:

Figure 1 is a diagrammatic side elevation of an otherwise conventional marine power plant, including the features of the invention;

Figure 2 is a plan view of the same;

Figure 3 is a side elevation of the novel portion of Figures 1 and 2 shown separately for clearness;

Figure 4 is an elevation of the same parts as Figure 3, as from a point outside the ship.

Figure 5 is a detail of the lower sea chest;

Figure 6 indicates the connection of a Diesel power plant to equipment according to the invention; and Figure 7 indicates the connections for a Great Lakes type plant using sea injection and a jet condenser.

In the embodiment of the invention selected for illustration the prime mover 10 of Figures 1 and 2 is steam driven, and may be either a reciprocating engine or a turbine or both. The exhaust steam from the prime mover 10 is passed through the surface condenser 12, where it is condensed to liquid form. So far as the present invention is concerned it is immaterial whether all of the condensate is returned to the boiler or not.

The cooling fluid for the condenser is taken in from the water in which the vessel floats, customarily referred to as "sea water." Such vessels are provided with a plurality of sea chests, of which I have indicated two at 14 and 16, built into the hull. The outer wall 18 of each sea chest is part of the outer wall of the ship, and is perforated, as at 19 (see Fig. 5), so that the chest is filled with a body of water in direct communication with the sea. The pump 20 circulates the sea water from the chests through the system, having its intake pipe 22 branched to take from either or both chests, under the control of the valves 24 and 26. The exit 25 from chest 14 is at the top, and the exit 27 from chest 16 is at the back. It is also customary to provide a third intake connection 28, controlled by valve 30, for taking liquid from the bilge, so that the pump 20 can be used in emergencies to take from inside the ship and save the ship from sinking.

From the pump 20 the sea water passes through pipe 32 to the condenser 12, and then through pipe 34 to discharge at 36 back into the sea. The valve 38 is normally used to throttle the system whenever that becomes necessary. Valve 40 in the pipe 32, valve 42 in pipe 34, and bypass pipe 46 with valve 44, are intended for use only in conjunction with the emergency bilge connection 28, to by-pass the condenser, and avoid its resistance if it is intact, or leakage inside the boat if it has been damaged.

All the parts so far described are conventional and the throttling just referred to has been the customary and the only available way for controlling the amount of cooling water flowing through the condenser. Such throttling is necessary over long periods of time and over a wide range, due to a variety of reasons, more particularly abnormally cold sea water or light load on the main engines, or both. And throttling has several serious drawbacks, more particularly abnormally low flow or high back pressure or both on the pump 20, and abnormal thermal gradients in the condenser 12. Such pumps are usually centrifugal, and centrifugal pumps cannot be throttled down to a minor fraction of their normal discharge without changing the flow characteristics in the pump itself—not infrequently to such an extent as to cause the pump to lose its suction and function by fits and starts or not at all, at a time when such failure may be disastrous. When reciprocating pumps are used excessive throttling may stall the type of pump commonly employed.

As for the condenser, if the sea water flowing through the tubes is kept at or above a certain critical velocity, its movement in the tubes is turbulent and keeps the tubes scoured and clean. Abnormally slow flow not only lets the tubes build up a coating that greatly reduces their heat transfer capacity, but the water will move without turbulence with a cold center portion, or core, and a thin warm layer next to the tube surface. This commonly referred to by those skilled in the art as stream line flow, and is characterized by a drastic reduction in the heat transfer obtained through the condenser tube wall.

One of the commonest sources of leakage in condensers is thermal expansion, which distorts not only the tubes in their fastenings at the tube sheets, but the tube sheets themselves in relation to the condenser shell. When throttling to compensate for 32° sea water, outlet temperatures as high as 112° F. are not uncommon, so that adjacent tubes of the first and second passes must assume different lengths. If this temperature strain does not rupture the tube fastenings, the resulting warping distorts the tube sheets and tends to tear them from the condenser shell. And either type of rupture permits sea water to leak into the condensing system and foul the condensate feeding the boiler, or in extreme cases the main engines.

Another serious danger when the ship is in floating ice, is that ice may cake against the sea chest long enough to melt itself partly into the openings 18 and thus rivet itself onto the sea chest and render the chest completely inoperative.

According to the invention there is provided a by-pass from the discharge pipe 34 to both sea chests. The down-take pipe 48, provided with valve 49, leads from the pipe 34 to both sea chests, with control valve 50 for sea chest 14 and control valve 52 for seat chest 16. In each sea chest I provide a baffle plate 54, pivoted on a transverse axis in front of the discharge of the by-pass pipe, which discharge is tapered to give a little extra velocity to the entering by-pass water.

The operation of the system according to the invention is as follows: When less sea water than the normal capacity of pump 20 should be taken in, due to light load or cold sea water or both, valve 49 and the valve 52 or 54 for the sea chest then in use, are opened to any desired degree, and if full opening does not give the desired amount of recirculation, valve 38 may be partly closed. This reduces the amount of fresh sea water taken in, but without reducing the normal volume flow through the pump 20 and the condenser 12. In this way any desired percentage, from 5% up to as much as 80% or 90% of the water entering the pump 20 may be water that has already been through the condenser once. As a practical illustration of the extent to which this avoids low flow and high temperature gradients, it will be noted that a condition of 20% normal flow with temperatures from 32° inlet temperature to 112° out temperature, and temperature rise of 80°; can be changed to 100% normal flow with temperatures from 64° inlet to 80° outlet, and temperature rise of 16°. Furthermore, in a properly designed power plant, with a condenser large enough to carry full load with full flow and a temperature rise of 40°, it will never be necessary to expose the condenser to 32° sea water. At full load with fresh sea water at 32° such a plant will operate with enough by-pass water to give the condenser 52° intake and 92° discharge. And when sea water is 70°, no water will be by-passed and the working range will be from 70° to 110°. The combined stream from the sea chest will be thoroughly mixed in passing through the pump, and the operating conditions of the main engine remain the same as would be obtained by throttling.

Whenever ice or weeds cause trouble by clogging the sea chest, they can usually be dislodged by manually swinging the baffle plate 54 by means of the hand lever 56. However, if this is not immediately successful, the intake can be shifted to another chest, while the discharge is still directed through the clogged chest. This creates a positive pressure and an actual discharge of water through the clogged chest, in addition to a strong flow at relatively high velocity issuing from the by-pass, which flow can be directed from side to side within the chest by means of the baffle 54, so that the contents of the chest will surge from side to side, as well as developing a positive thrust on the obstacle to dislodge it.

In Figure 5 I have indicated the character of the flow in the sea chest 14 when recirculating normally. It will be obvious that if the flow up through outlet 25 is stopped, the stream from pipe 48 will push outward. With the baffle as shown this pressure will impinge most strongly at the lower corner of the chest, but a 90° rotation of the baffle would shift the main impact to the upper corner. Most large ships have many more sea chests than two, and it will be obvious that by-pass connections for all of them will accomplish even greater flexibility in operation.

In Figure 6 I have indicated a Diesel engine 58, having a cooling jacket 60. In this instance the cooling unit is not a condenser, but a heat interchanger 63 through which the liquid for cooling the engine is forced by the circulating pump 64. Such a power plant calls for no modification of the invention. The pipes 32 and 34 are merely connected to the interchanger 63 instead of the condenser 12.

The practice in the Great Lakes differs because the sea water is pure enough for boiler feed uses. A good many ships on the Great Lakes cannot be used satisfactorily in salt water, because they have jet condensers arranged to use direct sea injection. In Figure 7 the jet condenser 66 may receive sea water direct from the pipe 32 and steam from pipe 67, but pump 20 can be omitted because the condenser vacuum will draw in the water. The pump 68 can discharge direct to pipe 34, and the operation permits of the withdrawal of a minor fraction of the flow in pipe 34 for boiler feed water through pipe 72 and pump 73. If it is desired to have the pump 68 available to prevent sinking, it is only necessary to provide valve 74 in the pipe 70, and connect the bilge pipe 28 to pipe 70 below valve 74.

Without further elaboration, the foregoing will so fully explain my invention that others may, by applying knowledge current now or at the time of such application, readily adapt the same for use under various conditions of service.

I claim:

1. The method of operating a marine power plant which comprises: cooling the main prime mover with an intermediate cooling fluid; circulating said intermediate cooling fluid in a closed circuit; cooling said intermediate cooling fluid with a final cooling fluid in a suitable heat interchanger; and at partial loads, delivering to said heat interchanger fresh final cooling fluid mixed with a varying percentage of spent final cooling fluid recirculated from the discharge from said interchanger; by such recirculation keeping the intake temperature to said interchanger relatively constant compared with variations in the temperature of the fresh final cooling fluid; storing fresh final cooling fluid as raw sea water in a sea chest; delivering the recirculating final cooling fluid into said sea chest with substantial velocity and in a direction to cause it to impinge on the intake openings of said sea chest; and returning spent final cooling fluid not used for recirculation direct to the sea.

2. The method of operating a marine power plant which comprises: cooling the main prime mover with an intermediate cooling fluid; circulating said intermediate cooling fluid in a closed circuit; cooling said intermediate cooling fluid with a final cooling fluid in a suitable heat interchanger; and at partial loads, delivering to said heat interchanger fresh final cooling fluid mixed with a varying percentage of spent final cooling fluid recirculated from the discharge from said interchanger; by such recirculation keeping the intake temperature to said interchanger relatively constant compared with variations in the temperature of the fresh final cooling fluid; storing fresh final cooling fluid as raw sea water in a sea chest; delivering the recirculating final cooling fluid into said sea chest, and returning spent final cooling fluid not used for recirculation direct to the sea.

3. In a marine power plant of the type comprising a prime mover requiring cooling; a closed circuit for an intermediate cooling fluid to cool the prime mover; and a heat interchanger in said closed circuit for withdrawing heat from said intermediate cooling fluid; the combination of a plurality of sea chests; each chest having a foraminated outer wall below the water level in communication with the water in which the vessel floats; connections for taking final cooling water from any one or more of said chests and delivering it to said interchanger; connections for delivering any desired portion of the spent, warm, final cooling water from said interchanger into any desired sea chest, to mingle with the contents of the chest; whereby a chest delivering final cooling water to said interchanger may be made to deliver water preheated to a desired degree, and a chest not delivering to said interchanger may be subjected to positive efflux of warm, spent water to flush it and clear the foraminations of its outer wall; manually controlled means in certain of said chests for directing the stream of spent final cooling water into various portions of the chest to localize and intensify the flushing action of said stream; and connections for returning direct to the sea any unused portion of the spent final cooling water.

4. In a marine power plant of the type comprising a prime mover requiring cooling; a closed circuit for an intermediate cooling fluid to cool the prime mover; and a heat interchanger in said closed circuit for withdrawing heat from said intermediate cooling fluid; the combination of a plurality of sea chests; each chest having a foraminated outer wall below the water level in communication with the water in which the vessel floats; connections for taking final cooling water from any one or more of said chests and delivering it to said interchanger; connection for delivering any desired portion of the spent, warm, final cooling water from said interchanger into any desired sea chest, to mingle with the contents of the chest; whereby a chest delivering final cooling water to said interchanger may be made to deliver water preheated to a desired degree, and a chest not delivering to said interchanger may be subjected to positive efflux of warm spent water to flush it and clear the foraminations of its outer wall; and connections for returning direct to the sea, any unused portion of the spent final cooling water.

5. In a marine power plant of the type comprising a prime mover requiring cooling; a closed circuit for an intermediate cooling fluid to cool the prime mover; and a heat interchanger in said closed circuit for withdrawing heat from said intermediate cooling fluid; the combination of a sea chest having a foraminated outer wall below the water level in communication with the water in which the vessel floats; connections for taking final cooling water from said chest and delivering it to said interchanger; connections for delivering any desired portion of the spent warm, final cooling water from said interchanger into said chest, to mingle with the contents of said chest; and manually controlled means in said chest for directing the stream of spent final cooling water into various portions of the chest to localize and intensify the flushing action of said stream, and produce positive efflux of warm water through a desired portion of said foraminated outer wall at the same time that the total flow through said wall is in an inward direction; and connections for returning direct to the sea any unused portion of the spent cooling water.

6. In a marine power plant of the type comprising a prime mover, the operation of which entails dissipation in the form of heat of at least a portion of the heat energy supplied thereto; a heat interchanger for dissipating said heat; a plurality of sea chests; each chest having a foraminated outer wall below the water level and in communication with the water in which the vessel floats; connections for taking sea water from any one or more of said chests and delivering it to said interchanger; connections for delivering to any desired sea chest any desired portion of the spent sea water from said interchanger, to preheat the sea water in said chest; and connections for discharging direct to the sea any unused portion of the spent sea water from said interchanger.

7. A marine power plant according to claim 6 in which said interchanger is part of a closed circuit in which circulates an intermediate cooling fluid.

8. A marine power plant according to claim 6 in which said interchanger condenses the motive fluid employed in said prime mover.

9. A marine power plant according to claim 6 in which said heat interchanger condenses the motive fluid employed in said prime mover by direct admixture of said motive fluid with sea water.

FREDERICK A. FAVILLE.